(12) United States Patent
Olsson

(10) Patent No.: US 11,156,985 B2
(45) Date of Patent: Oct. 26, 2021

(54) SYSTEM FOR OPTIMIZATION OF INDUSTRIAL MACHINE OPERATION THROUGH MODIFICATION OF STANDARD PROCESS PARAMETER INPUT

(71) Applicant: Tomologic AB, Stockholm (SE)

(72) Inventor: Magnus Norberg Olsson, Stockholm (SE)

(73) Assignee: Tomologic AB, Stockholm (SE)

( * ) Notice: Subject to any disclaimer, the term of this patent is extended or adjusted under 35 U.S.C. 154(b) by 230 days.

(21) Appl. No.: 16/323,437

(22) PCT Filed: Jul. 4, 2017

(86) PCT No.: PCT/SE2017/050749
§ 371 (c)(1),
(2) Date: Feb. 5, 2019

(87) PCT Pub. No.: WO2018/030939
PCT Pub. Date: Feb. 15, 2018

(65) Prior Publication Data
US 2019/0179291 A1    Jun. 13, 2019

(30) Foreign Application Priority Data

Aug. 9, 2016 (SE) .................................... 1651097-6
Oct. 21, 2016 (SE) .................................... 1651380-6

(51) Int. Cl.
*G05B 19/4155* (2006.01)
*G05B 13/02* (2006.01)

(52) U.S. Cl.
CPC ..... *G05B 19/4155* (2013.01); *G05B 13/0245* (2013.01); *G05B 2219/45152* (2013.01)

(58) Field of Classification Search
CPC ............ G05B 19/4155; G05B 13/0245; G05B 2219/45152
See application file for complete search history.

(56) References Cited

U.S. PATENT DOCUMENTS 6,233,500 B1 * 5/2001 Maias .................... B21C 23/00
                                                  419/28
7,933,679 B1    4/2011 Kulkarni et al.
(Continued)

FOREIGN PATENT DOCUMENTS

EP    1471404 A2    10/2004
EP    2267565 A2    12/2010

OTHER PUBLICATIONS

Mukherjee et al., "A review of optimization techniques in metal cutting processes," *Computers & Industrial Engineering*, pp. 15-34 (2006).
(Continued)

*Primary Examiner* — Gary Collins
(74) *Attorney, Agent, or Firm* — Marshall, Gerstein & Borun LLP (57) ABSTRACT

The present invention relates to method for modifying process parameters based on optimum operation performance criteria for a metal working process, said method comprising the steps of inputting standard process parameters for at least one product to be machined and generating operational data based on the standard process parameters. Operational data is compared with optimized operation performance criteria and is presented to a decision-making entity. This entity may be allowed to modify the process parameters so as to improve operation of the metal working process.

17 Claims, 3 Drawing Sheets

(56) References Cited

U.S. PATENT DOCUMENTS

| | | | |
|---|---|---|---|
| 2004/0267395 A1* | 12/2004 | Discenzo | G05B 13/024 700/99 |
| 2006/0079987 A1 | 4/2006 | Cha et al. | |
| 2013/0253694 A1 | 9/2013 | Chung et al. | |
| 2015/0165549 A1 | 6/2015 | Beutler | |
| 2015/0205289 A1* | 7/2015 | Henning | G06F 30/20 700/98 |

OTHER PUBLICATIONS

Liu et al., "A Modified Genetic Algorithm Based Optimisation of Milling Parameters," *International Journal of Advanced Manufacturing Technology*, pp. 796-799 (1999).

Supplementary European Search Report issued in European Patent Application No. 17839921 dated Feb. 28, 2020.

International Search Report issued in PCT Patent Application No. PCT/SE2017/050749 dated Mar. 10, 2017.

Written Opinion issued in PCT Patent Application No. PCT/SE2017/050749 dated Mar. 10, 2017.

Swedish Search Report issued in Swedish Patent Application No. 1651380-6 dated Apr. 19, 2017.

Office Action issued in Swedish Patent Application No. 1651380-6 dated Apr. 19, 2017.

Office Action issued in Swedish Patent Application No. 165109706 dated Feb. 13, 2017.

Swedish Search Report issued in Swedish Patent Application No. 1651097-6 dated Feb. 13, 2017.

\* cited by examiner

SYSTEM FOR OPTIMIZATION OF INDUSTRIAL MACHINE OPERATION THROUGH MODIFICATION OF STANDARD PROCESS PARAMETER INPUT

TECHNICAL FIELD

The present invention relates to a method, an industrial machine system, a computer program product and a non-transient computer-readable medium for modifying process parameters based on optimum operation performance criteria for an industrial machining operation, such as a metal working process.

BACKGROUND ART

Industrial machine systems of today typically consist of a machine with an actuator system for providing relative motion between a machine part or operating device and a workpiece. State of the art industrial machine systems are highly specialised to perform operations like for instance beam cutting, milling, turning, drilling, boring, punching, punch pressing, press-breaking, bending, welding and assembly operations. The machine system is a substantial investment to most potential customers, in particular to smaller or medium-sized workshops, why the versatility and productivity that the machine system is meant to contribute with to the business is a key factor when making investment decisions. Once an investment has been made, one of the main factors for increasing the productivity is to ensure that the machine system is used to its maximum.

The industrial machine systems are controlled by means of a CNC (Computerized Numerical Control) unit, an NC (Numerical Control) unit, a PLC (Programmable Logical Control) unit and/or related sensing and processing equipment that together serve to provide instructions to an actuator system to perform required movements in order to execute intended industrial operations. The machine system further comprises a machine controller, which is essentially a computer having a processor and a conventional operating system, such as Windows or Linux, configured to control the CNC/NC/PLC unit based on machine controller instructions, such as G-code or XML. The machine controller includes or is connected to an HMI (Human-Machine Interface), and is configured to read programs and to gather machining parameters such as cutting parameters. This allows the machine controller to issue complete instructions to the CNC/NC/PLC unit for execution by the actuator system comprised in the machine. Conventionally, both the CNC/NC/PLC unit and the machine controller are physically included in the industrial machine, and the industrial machine forms an independent and self-contained industrial machine system, wherein the machine controller forms an essential and physically connected part of the machine.

A CNC system may be defined so comprising a machine tool, herein referred to as a machine, a part program, which is a detailed set of commands followed by the machine, and a machine controller (or machine control unit), which is a computer that stores the program and executes its commands into actions by the machine tool.

Management, control and monitoring of operations performed by an industrial machine need expertise and experience from a machine operator as well as software-based support systems to work out. To generate a program for the operation of for example manufacturing of a particular metal product, the program needs to be based both on a set of predetermined principles, such as the calculation of operating sequences based on optimization techniques or shortest path principles, but also on an operator's know-how of what will be the best sequence from a more practical point of view. Variables to consider and control may be related to materials properties, logistics and of course to the actual geometries, shapes, sizes and dimensions and the order in which products are to be produced.

Manufacturing processes according to prior art are based on a more or less linear sequence involving the steps of constructing and designing a product, followed by purchasing of required production materials, reservation of production capacity and allocation of resources. Products are then manufactured and delivered to stock or to a customer. Traditional manufacturing processes tend to be rather rigid and therefore fail to utilise production means to their full potential. Hence, full efficiency and productivity will not be achieved throughout the manufacturing process as steps in the process cannot be synchronized. One of the reasons for this is that data, such as dynamic production variables, that would be required to further optimise a manufacturing process is stored at separate locations. Since the separate locations of data prevent exchange and comparison of process parameters, maximum productivity will not be obtained for a given manufacturing process with a certain set of production means available.

As mentioned, industrial machining operations, but also related design- and construction processes (including the option of parametric design), selection of material, purchasing, logistics etc., are based on large amounts of dynamic production variables and varying prerequisites, all influencing the result of an industrial operation. A human operator will consequently be exposed to significant complexity when trying to optimize an operation involving large amounts of variables. The operator may know what is actually desired, but would need assistance in determining the most efficient way of obtaining the desired result, an assistance, or preferably an automated service, that is presently nowhere to be found.

Therefore, a related problem that needs to be considered when setting up and performing an industrial machining operation is to manage this complexity and large amount of influencing parameters. If not properly managed, it may adversely affect the efficiency, precision, quality and productivity of the industrial machining operation, whether the influencing parameters are related to logistics, materials properties, production quality, presently used tooling, available tooling or operators' needs. If properly managed, a significant improvement of productivity and efficiency is to be expected.

SUMMARY OF THE INVENTION

It is therefore an object of the present invention to alleviate the mentioned problems associated with prior art technology by providing a method, an industrial machine system, a computer program product and a non-transient computer-readable medium for modifying process parameters based on optimum operation performance criteria for a metal working process, said method comprising the steps of:
inputting standard process parameters for at least one product to be machined,
generating operational data based on the standard process parameters,
selecting at least one optimization technique and defining a function, said function comprising the standard process parameters, generating the function for optimization by using the standard process parameters as a basis to define ranges for performance variables and/or ranges for process parameters, applying the optimization technique to said function, whereby optimum operation performance criteria are determined to obtain a set of commands to be used for controlling the metal working process, comparing the generated operational data with the optimum operation performance criteria, and presenting the optimum operation performance criteria to a decision making entity and allowing it to modify the standard process parameters based on the presented optimum operation performance criteria for the metal working process.

By standard process parameters is here meant variables that are input without prior optimization and without prior comparison of various sources of information relating to the metal working process. Operational data is typically machine settings required to convert a raw material to an end product when applying a predefined machining process and machine system. The optimization technique is any method by which a process parameter can either be maximized or minimized depending on the circumstances. When applying the optimization technique, operational data within predetermined ranges can be generated, which offer alternatives for carrying out a metal working process. Those alternatives could not have been realized unless several process parameters had been considered and thus provides an opportunity to further enhance productivity.

As mentioned, the present invention enables a decision-making entity, such as a human operator or computerised means, to use data from various sources to increase efficiency and productivity. By using the invention as a supervising service that is configured to collect information from various sources, of which the machine may be one, all of the standard process parameters that have been input may be modified by using all available information. Examples of other sources of information may be elements in connection with the machine or machine controller via Internet of Things (IoT) enabled elements, an enterprise resource planning system (ERP), a manufacturing execution system (MES), a customer relation management system (CRM), a sourcing management system (SMS), a computer aided design/manufacturing systems (CAD/CAM) and related databases.

According to embodiments of the present invention, all relevant information is made available via the industrial machine system and/or other sources of information. This makes it possible to use agile iterative processes to optimize each step, either in advance or while carrying out the process according to actual settings and machine configurations. The optimization process could also be used for design, purchasing, ordering and production planning. For example, product design may be modified with available tools, materials may be modified according to present stock, delivery time may be modified with machine availability and product design may be modified to achieve a certain quality. Depending on the situation, this quality may be both lower and higher than originally expected, but will always be within specified boundaries.

Further examples of process parameters that may be modified using means and methods according to the present intention will follow:

A production process may be modified from an integrated combination machine, such as punch/bending to a combination of separate processes, for instance laser cutting and press breaking. This example would be a modification aiming at reducing production costs, for the manufacturing of an identical or nearly identical product.

Beam cutting of free-form shapes like individual units may be modified to cutting of free-form shapes as clusters with only one single cut from the cutting beam in-between. A part geometry segment and/or part tangential segments could be modified by interchanging or changing their relative positions and/or shapes, preferably leading to an improvement in part quality when cutting parts out of sheet metal.

Material thickness as well as material type and/or quality could be modified in order to reduce weight and cost per product unit. Alternatively, product geometry could be modified in order to reduce material waste and thereby decrease production cost. Material size, shape, format and dimensions could be reduced for the same or similar reasons as above.

Part and/or product geometry could be modified so as to minimize set-up time and cost, a reduction which is achieved since the need to change tooling may be reduced or even eliminated. Material size, shape, format and dimensions may be modified also to require less amounts of material in stock.

Batch sizes could be adjusted to reduce costs, an adjustment that may lead to a possible alteration in machine configurations depending on the batch size. The actual machine configurations may also be modified to obtain various gains and simplifications in the manufacturing process.

Process parameters relating to the metal working process are typically pre-defined or predetermined parameters for the manufacturing of a particular product, such as production order, batch volumes, product geometry and predefined tolerances. They can also be required metal working operations, required tooling configuration, automation configuration for grip and/or pick and place and/or stacking of produced parts, stacking pattern of produced items and/or process parameter data from previous operations. The process parameters are typically not relating to machining parameters, which is a different type of parameters used to control the machining operation.

Performance variables on the other hand, that relate to the metal working process are typically variables such as determined tolerances of produced items, process time, tooling availability, tooling lifetime, material removal rate, operator working environment, order stock, delivery time, required pressing position and/or performance variable data from previous operations. Performance variables are dynamic and can be adjusted within a certain range in order to achieve predefined properties of a product.

Determined tolerances of produced items (as opposed to predefined tolerances, see above) are parameters relating to the quality of products and include any of the following performance variables: material properties, such as hardness, toughness, size and thickness, product geometries, such as radii, angles and dimensions and production defects, such as bulges, bending lines, pressure deformations, lead-in marks, micro joint marks and other visual attributes.

Modified data may further be used in different applications, such as CAD, CAM, ERP, MES, CRM, sourcing management etc. The invention is applicable within areas, such as purchasing and optimization of machine performance criteria. These criteria may be defined as instructions or as a program of instructions for the control of an industrial machine, such as a CNC machine tool.

An example of traditional, linear scheduling is the tasks of whether to produce a first type of punch or a second type of punch. This is solved by a traditional scheduling or manufacturing execution system. Another example is a piece that needs to be punched out of a material before being bent, which decision could also be made in a linear flow management system. A third example is whether to use one or more cutting heads in a beam cutting operation, which is a linear decision based on the default number of cutting heads on the machine divided by the number of parts to produce. Also this third task is solved by means of a traditional scheduling system or a manufacturing execution system. All of the above examples could of course also be solved by means of the present invention.

However, the present invention differs from traditional linear scheduling systems. It allows for information to be utilised from a plurality of sources in order to determine for example whether a certain product should be produced by laser cutting and press-breaking techniques instead of a combination of punching and bending technique. This facilitates a reduction in production cost and simultaneously enables enhanced quality of the product. This is made possible by the modification of standard process parameters based on the presented optimum operation performance criteria for the metal working process.

BRIEF DESCRIPTION OF THE DRAWINGS

Various embodiments and examples related to the present invention will now be described with reference to the appended drawings, in which.

DETAILED DESCRIPTION

Both the detailed description and the drawings to which it refers are given by way of example only. Same reference numerals from different figures refer to the same element.

Figure 1:
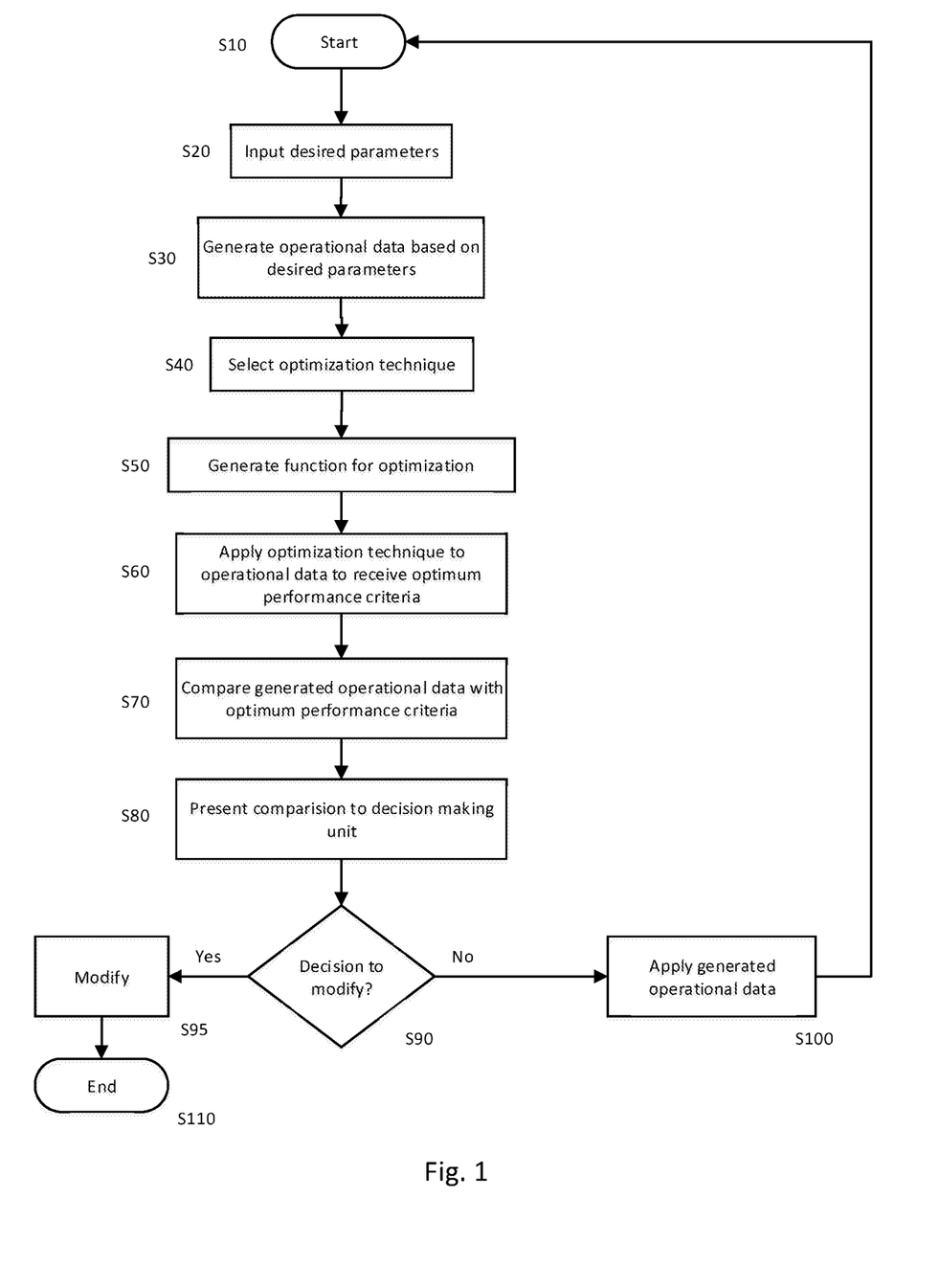
FIG. 1 is a flow chart that depicts an optimization of an operational sequence of an industrial machine system or the like by inputting standard process parameters followed by modifying and presenting the optimum operation performance criteria.

FIG. 1 is a flow chart that depicts an optimization of an operational sequence in an industrial machine system or a manufacturing support system, which is connected or at least is connectable to multiple sources of information. The system may be configured to provide support for business operations relating to design- and construction processes (including the option of parametric design), selection of material, purchasing, logistics etc., by inputting standard process parameters followed by modifying and presenting the optimum performance criteria.

The sequence starts (S10) in that an operator either manually or automatically inputs (S20) standard process parameters relating to a product to be machined or evaluated. Product in this context refers either to a single item to be produced or to a plurality of components that may be assembled. The input of standard process parameters can be made at any location. One example is that an application ("app") developed for a mobile terminal, such as a so-called smartphone, is used as a tool for the input of standard process parameters. This app may then be provided to all stakeholders along the value chain in a production process, for example designers, purchasers, logistics professionals, manufacturing specialists etc. In a next step, the computing system according to the invention generates (S30) operational data based on the standard process parameters.

After having generated operational data, the computing system, which is also in connection with or is connectable with multiple information sources, selects (S40) at least one optimization technique to define a function, a function which comprises the standard process parameters. This is followed by generation (S50) of a function for optimization by using the standard process parameters as a basis to define ranges for performance variables and/or ranges for process parameters. Information related to process parameters and performance variables may be retrievable via integrated multiple data sources.

The generated function for optimization is applied (S60) to the function comprising standard process parameter, whereby optimum operation performance criteria can be determined for the standard process parameters and performance variables to obtain a set of commands to be used for controlling the metal working process. Information related to standard process parameters and performance variables may be retrievable via integrated multiple sources of information.

As soon as the optimum operation performance criteria have been determined, the operational data is compared (S70) with the optimum operation performance criteria, and in case there is a difference, and the optimum performance criteria provides a performance advantage to the operator, the result is presented (S80) to a decision-making entity. This decision-making entity, whether being a human operator, a computerised, fully or semi-automated service layer, may be allowed to modify the standard process parameters based on the presented optimum operation performance criteria for the metal working process. The decision-making entity may also be realized in the form of an app for a smartphone, preferably the same or an app similar to the one mentioned in connection with the step of inputting standard process parameters.

If the decision-making entity, when assessing (S90) the differences between standard process parameters and the optimum operation performance criteria, returns a recommendation or decision to modify (Yes), then at least one process parameter comprised in the proposed operational sequence is modified (S95) and is adopted and used as modified operational data by the industrial machine system. In case the decision-making system returns a recommendation or decision not to accept the proposal (No), the sequence continues in that the originally generated operational data is applied (S100). Whichever decision is made, the sequence continues to the starting point (S10) or endpoint (S110). Modified data may further be used in different applications such as CAD, CAM, ERP, MES, CRM, sourcing management etc. The present invention is also applicable within areas such as purchasing and optimization of machine performance criteria, criteria which may be defined as instructions and/or a program of instructions for the control of an industrial machine, such as a CNC machine tool.

Figure 2:
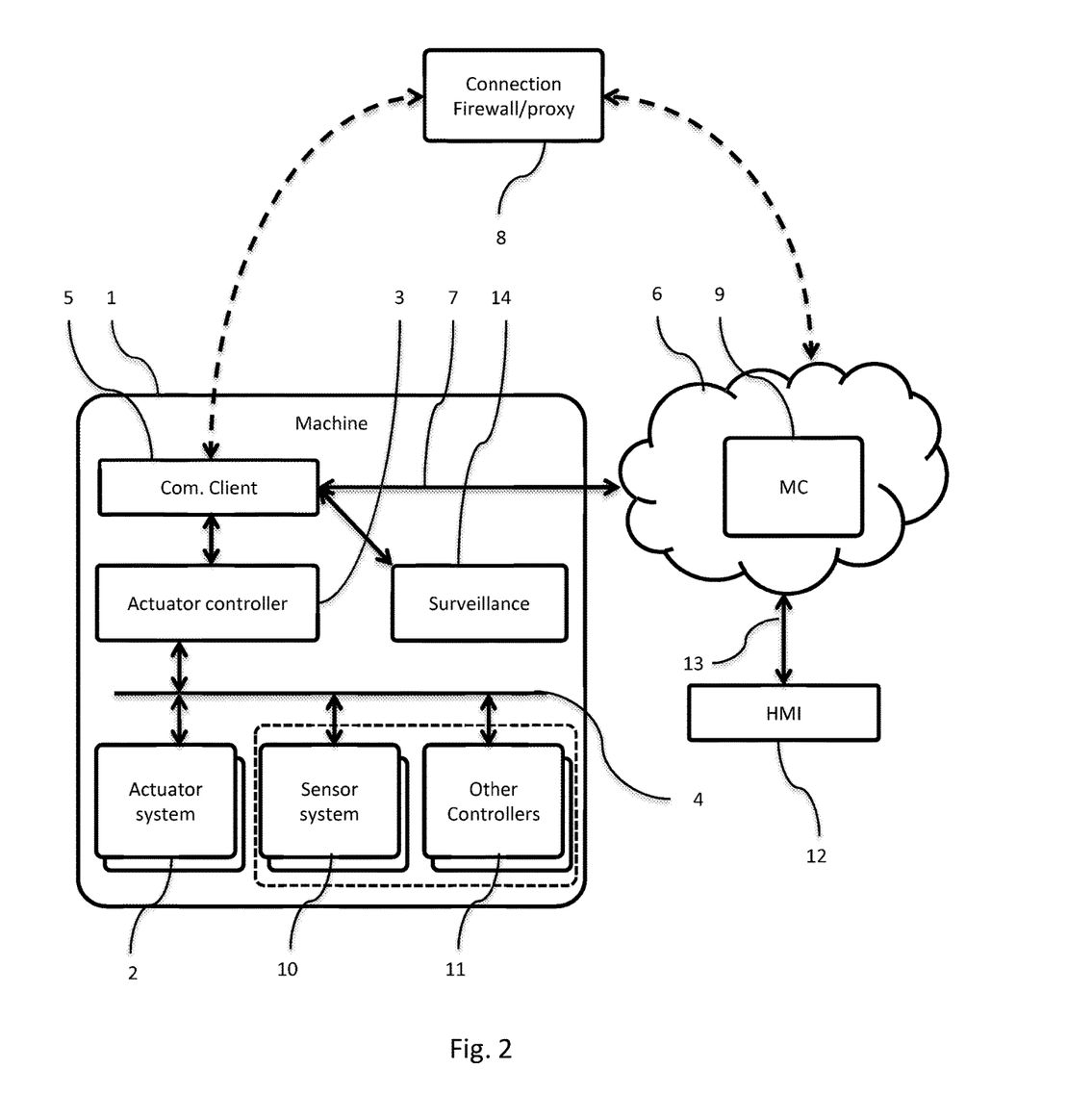
FIG. 2 graphically illustrates an industrial machine system according to one embodiment.

FIG. 2 graphically illustrates a first embodiment of the invention. The system comprises a machine 1, which may be a machine for beam cutting (2- or 3-dimensional), punching, punch pressing, press-breaking, bending, gluing, sewing, tape and fibre placement, milling, drilling, turning, routing, picking and placing and combinations of such machines. Beam cutting includes techniques such as laser, welding, friction stir welding, ultrasonic welding, flame and plasma cutting, pinning and sawing.

The machine comprises an actuator system 2 for performing an industrial operation. The actuator system comprises at least one actuator, i.e. a motor for linear or rotational movement. Typically, the actuator system is configured for performing two-dimensional or three-dimensional movements of an operational part of the machine and a workpiece relative to each other.

The actuator system is controlled by an actuator controller 3 in the form of a CNC/NC/PLC unit and/or related sensing and processing equipment. The actuator controller controls the actuator on a low level, i.e. by sending low level control commands for the actuation of the actuator system. The actuator system is connected to the actuator controller via a machine internal communication network 4, e.g. including a communication bus.

The machine optionally comprises other systems, such as a sensor system 10 for sensing various processing parameters of the machine and other controllers 11 for processors, networks, communication links or other computing devices for transmitting data and making decisions. These systems may also be connected to a machine common internal communication network 4 and to the computing system in connection with the machine, such that a machine controller 9 is connected to the sensor system to receive sensor data. The machine controller may be further configured to remotely control the actuator system of the machine in response to the sensor data.

As an alternative configuration, the CNC/NC/PLC unit and/or related sensing and processing equipment and/or the mentioned machine controller may be physically attached to or otherwise connected to the industrial machine. The industrial machine then forms an independent and self-contained industrial machine system, wherein the machine controller forms an essential and physically connected part of the machine. Both of the two alternative embodiments of industrial machine systems have their respective advantages, and for the purpose of the present invention, integrated or remote configurations of sensor system and actuator controller are both equally applicable.

The machine may also comprise a communication client 5 connected to the actuator controller 3 for establishing communication with a computing system 6 in connection with the machine, when configured according to the remote alternative. The communication client is then a functional unit which enables the machine or any sub-component of the machine to communicate with the machine controller. The computing system in connection with the machine may be a cloud-based computing system connected to the internet. A centrally arranged computer in connection with or connectable to multiple data sources is an alternative embodiment. The communication client 5 and the computing system in connection with the machine may be configured to establish secure communication 7 with each other over the internet, for instance by initiating encrypted communication by HTTPS/TSL or by establishing a VPN (virtual private network). Alternatively, the communication may be established over a firewall or a proxy server 8. As a further alternative, any sub-component of the machine, such as the actuator controller 3, may be configured to connect to the computing system 6 in itself, or alternatively to the mentioned central computer with access to multiple data sources, but as mentioned both remote and integrated configurations are equally applicable for this purpose.

The mentioned computing system 6 in connection with the machine includes a machine controller, which may be remotely connected to the machine, and wherein the machine controller may be configured to control the actuator system of the machine remotely via the actuator controller by modifying operational parameters of the actuator controller.

The machine controller 9 is hosted in a virtual machine in the remote computing system 6. In that way the machine controller resource may be exploited in an efficient way. The machine controller may e.g. be configured to read and execute machine program code, control machine parameters, allow manual control or adjustments of machine parameters, and function as an interface to associated systems. The machine controller is connected to a HMI (Human-Machine Interface) unit 12 which may be remotely connected to the machine controller via an internet connection 13 and in another embodiment is integrated with the machine. Either way, an operator of the machine may supervise and control the operation of the machine from a remote location, e.g. connected to the internet. The HMI unit 12 and/or remote computing system 6 may be configured to require user identification of an operator, e.g. by requiring passwords or other identification means.

An embodiment of the invention is illustrated in FIG. 2. Locally on the machine 1 is included an actuator system 2, comprising actuators for performing machining operations. An actuator controller 3 is part of or connected to the actuator system 2. The actuator controller is configured to receive instructions from the remote machine controller and execute instructions block by block in a closed loop system. Each task performed by an actuator is hence monitored and after a completed sub-operation, the actuator will perform the next sub-operation until a whole operation is completed. This means that the operation of the actuators of the machine is controlled by the actuator controller on a low level. The actuator controller typically includes a memory and a processor in order to save and execute instructions and to log data. The actuator system does not involve a conventional machine controller or HMI. The actuator system of the machine is hence dependent on receiving instructions from the remote machine controller. Once a complete set of work instructions or a defined sub-set thereof has been received and verified, it may be executed without further instructions from the machine controller. A sub-set of work instructions may be a part of a complete machine operation, but at least involves sufficient information for the actuator system to perform at least parts of an operation. The operation is preferably performed step by step in a closed loop system within the machine requiring a minimum of manual activities from an operator. The machine is only furnished with simple functions such as an emergency stop button and an on/off button. Other than that the machine is dependent on commands from the remote machine controller to operate.

The machine controller is physically located remote from the machine, typically in the cloud. The monitoring of an ongoing process, loading of instructions, modification of instructions and creating new instruction may only be made at the remote machine controller. Hence, the inventive machine controller corresponds to a conventional machine controller, only it is not a physical part of the machine but remote connected to the machine. The instructions monitored and controlled by the machine controller and the interconnected HMI include operational parameters such as cutting velocity, cutting depth, pressure and so on.

The machine controller is not part of the closed loop system of the actuator controller. Hence, unless new instructions are sent from the machine controller, the actuator system at the machine will conclude a fully received operation instruction without awaiting further instructions, unless specific instructions to conclude or alter the operation are received from the machine controller. Typically though, instructions are only provided for a full operation and new instruction will therefore only count for subsequent operations, not ongoing operations. This may be set as a safety arrangement but is up to the operator to decide which type of operational security should be implemented.

The machine controller is configured to send instructions, one at the time or several batched instructions. Any conventional manner of sending information may be utilized. The machine controller is further configured to receive information and make decisions based on said information. For example, the machine controller may act on feedback data and make decisions and/or send new instructions based on said feedback.

The inventive system provides for a possibility of remote controlling of an industrial machine, without risking that commands are lost as a consequence of bad communication due to for instance latency in the internet connection. This is made sure e.g. because an operation is received and acknowledged in full at the actuator controller. Thus, communication failures will be discovered immediately, and operational commands can be repeated when necessary.

In order to facilitate surveillance, the machine comprises a surveillance unit 14, such as a camera, video camera or other image capturing means, for monitoring operations by the machine. The surveillance unit is connected to the remote computing system 6 via the communication client 5 and configured to provide operational information to the remote computing system. The operational information is processed and transmitted to the HMI 12.

The machine controller is configured to receive a machine program from a CAD/CAM system or by manual entry from an operator, e.g. via the HMI unit 12.

According to one embodiment, the remote computing system is configured to monitor an operational parameter of the machine and to disable the remote control of the actuator system of the machine by the machine controller when the operational parameter exceeds a threshold value. Such an operational parameter may be the operating time, the number of operational cycles performed by the machine etc. Thus the operational costs and the use of the machine may be controlled and limited by limiting access to the machine controller.

The remote computing system is configured to collect machine and/or production data and transfer the data to another system (not shown) for data analysis and/or optimization. The machine data may be used to e.g. optimize the supply chain (purchase, manufacturing, distribution), the demand chain (marketing, sales, service), machine maintenance or for other big data applications.

The surveillance unit may also be configured for monitoring produced items and their various properties, including their tolerances. Computer vision is another term used in the industry for this identification of properties related to geometry. By tolerances is meant material properties, such as hardness, toughness, size, shape, product geometries, such as radii, angles and dimensions, and production defects, such as, bulges, bending lines, pressure deformations and/or other visual attributes. The surveillance unit may further be connected to the computing system 6 in connection with the machine, via the communication client 5 and configured to provide operational information to the computing system.

In one embodiment the computing system in connection with the machine is configured to monitor an operational parameter of the machine, and disable the remote control of the actuator system of the machine by the machine controller when the operational parameter exceeds a threshold value. Such an operational parameter may be the operating time, the number of operational cycles performed by the machine etc.

The computing system is configured to collect machine and/or production data and transfer the data to another system for data analysis and/or optimization. This system may be an enterprise resource planning system (ERP) of manufacturing execution system (MES) of any kind. The machine data may be used to for example optimize the supply chain, i.e. purchase, manufacturing and distribution; the demand chain i.e. marketing, sales and service; and maintenance of the machine or its integrated or remote parts. Machine data may also be made available for other systems, such as big data applications designed to merge data and draw conclusions based on large amounts of information, which reduces the probability of drawing incorrect conclusions.

Figure 3:
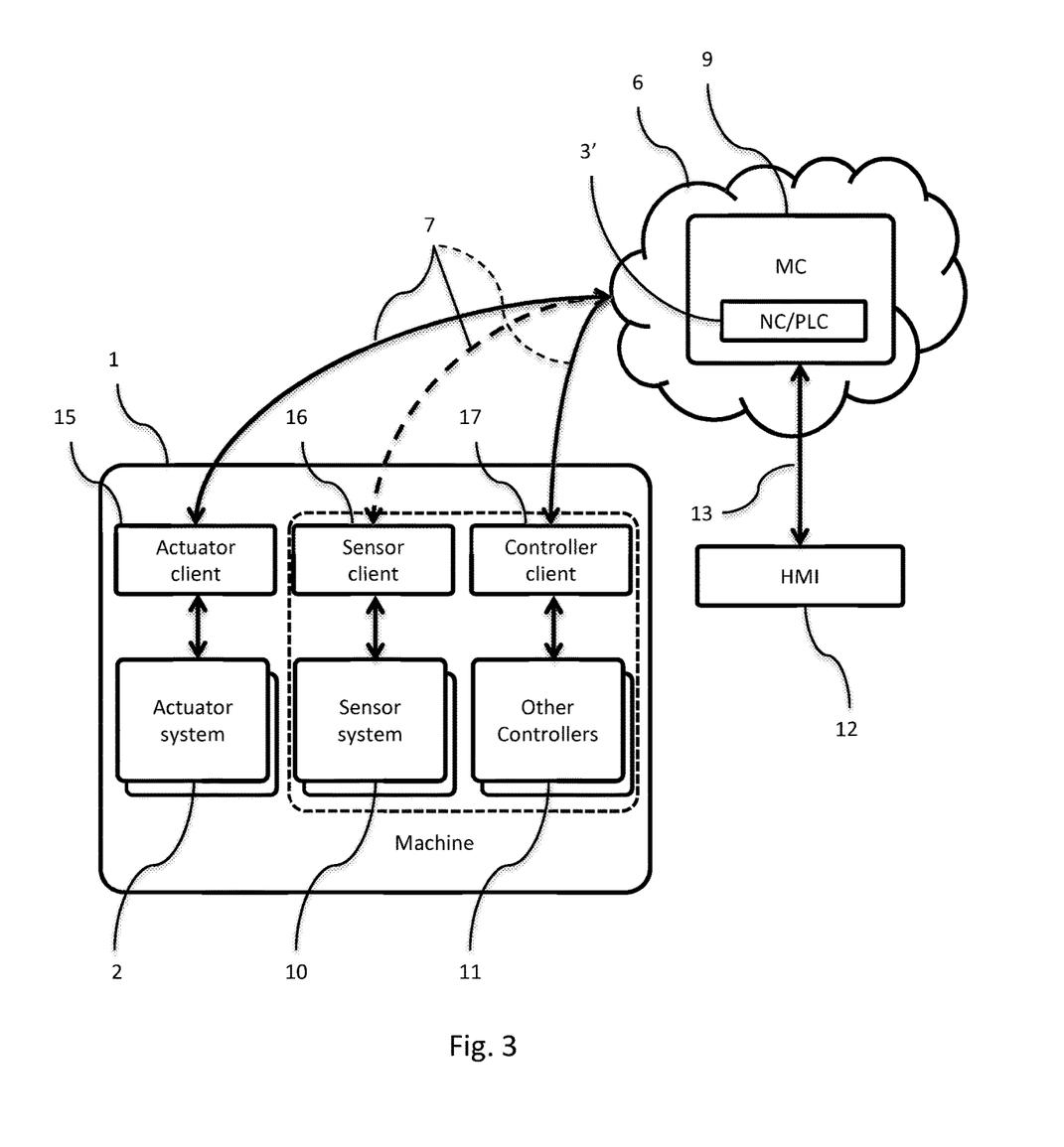
FIG. 3 displays another embodiment of an industrial machine system according to the invention.

FIG. 3 displays an alternative embodiment of an industrial machine system according to the invention. The industrial machine system differs from what is described in relation to FIG. 1 in that the machine does not comprise an actuator controller. The actuator controller 3' is physically disconnected to the machine and comprised in the computing system 6 in connection with the machine. The computing system is connected to the machine via one or more data lines 7, e.g. over the internet, which may be encrypted. The machine 1 comprises at least one communication client 15 for establishing communication between the machine and the computing system 6 in connection with the machine. This communication client 15 is connected to the actuator system 2 of the machine, and thus called the actuator client. The client is configured to send and receive low level communication from the actuator controller to the actuator system. Similarly, the machine may optionally comprise a sensor communication client 16 for communicating any sensor data from the sensor system 10, and any further controller clients 17 for communicating with other controllers 11 in the machine. Similar to what is shown in relation to FIG. 2, the communication between the machine and the computing system in connection with the machine may be the established over a firewall or a proxy server.

Below will follow examples of the present invention, intended to further elucidate the function and working principles. As has been explained in connection with the background of the invention, traditional processes of production planning are sequential to their nature. This means that information to control a production process is collected from a local database, and the production planning is made in response to instructions emanating from locally stored information. An example of this could be 1) retrieve an order, 2) select or create at least one controlling algorithm, 3) produce a part of a certain raw material quality, and 4) form a certain component by means of bending, milling, turning, etc., 5) deliver the component to a customer according to order specifications. This process is sequential to its nature, and data to control the process is collected locally.

The present invention, as has been previously described, utilizes various sources to collect information via the mentioned central computer, such as a batch of orders including geometric drawings, a batch of material, a batch of tools and a machine's existing configuration. Information relating to the production process according to this specification generally comes from different sources, e.g. an ERP/MES, the machine, IoT enabled units, CAD/CAM and one or more surveillance units. The information is collected by means of a central computer, which is configured as an intermediate means and is situated in-between various end-points. The end-points are typically sources of information that may or may not influence a production process, and are comprised of for example the previously mentioned ERP/MES, the machine, IoT information, CAD/CAM and surveillance units. Information related to process parameters and performance variables may be retrievable via integrated multiple sources of information.

The central computer may either be a general purpose computer or the computer that is configured to function as the machine control. The central computer will always be connected, or is connectable, to at least two end-points comprising data, in order to obtain information subject to optimization. That is believed to be a minimum requirement in order to carry out and fully accomplish a non-sequential optimization process on multiple variables. Several methods of optimization may be used, based on combinatorics, dynamic variation, multivariate analysis etc. Any of the methods allow for non-sequential and non-linear optimization, and are well-suited for use in complex systems with large numbers of dynamic variables.

The present invention utilizes non-sequential optimization, which is a numerical process or method that is neither sequential nor linear as compared to traditional processes. Several of the steps in a production process may be subject to optimisation. One example is geometry of parts to be produced, a geometry that may be modified to reduce tool changes. Another example is that scheduling of machining activities may be altered to reduce setup time provided that information is retrieved from for instance a machine, a surveillance unit and/or from IoT enabled units. Third and fourth examples are scheduling of machining activities that may be adjusted to reduce material changes, provided that information is gathered from at least two end-points; and information that can be retrieved and re-used from previous process steps, e.g. visual attributes via a surveillance unit or modification of tool combinations or the rotation of a part on its surface. Other conceivable examples are to reconfigure machine tools, such as the back-gauge positioning, pressure, pressing position etc. or the ordering of tools, materials, maintenance, spare parts for reducing production disruptions.

One of the prerequisites to making this type of optimization is to allow retrieval of data from multiple data sources e.g. ERP/MES, the machine and its configuration, IoT information, CAD/CAM and the machine surveillance unit. Information is then retrieved by a central computer and made available therefrom in order to allow for optimization of several separate process steps in relation to their current status. This includes also dynamic influences that are not controllable, since may be dependent on circumstances out of reach, such as updates in a management system.

The present invention may also introduce control of the so-called modifiability and customizability in various end-points containing information, such as ERP/MES, the machine and its configuration, IoT, CAD/CAM (both with respect to design and configuration) and at least one surveillance unit. For example, by means of the present invention, it is possible to change the materials specification as a measure to potentially reduce material and tool changes, the mandatory tolerance intervals and relevant ranges of strength and solidity. In accordance with another embodiment of the invention, it is also possible to change the product geometry/shape to minimize tool changes but still maintain tolerances from drawings or as an alternative, on which coordinates visual marks exist that can be back gauge positioned for complete avoidance. It may also be possible to schedule jobs to reduce material/tool replacement while keeping the delivery time. This allows communication with the customer so as to possibly allow the delivery time to be a variable influencing the price of the produced item. In order to achieve those options and new opportunities, two or more end-points must be able to control in a non-sequential fashion, e.g. via the machine tool, via IoT information and a database in ERP/MES to schedule orders, tools, materials change, change product geometry. For instance, an amendment to the geometry that may lead to a reduction or minimization of tool changes can be checked against any form of tolerance interval in a drawing that can be available in ERP/MES or even available at a customer or designer as a variable influencing the ration between production cost and market price.

As has become apparent based on the above, the present invention is differentiated from traditional process planning systems (MES) carrying out production scheduling, systems that are configured to retrieve information from a local database. Those systems may even rely on an operator who keys in data on orders and delivery, which is followed by sequential scheduling. The present invention is based on an entirely different level of optimization based on actual, even real time data, a central computer that retrieves, a computer that also in some cases may share information. According to the invention, the central computer is connected to, connectable to, or integrated with, multiple end-points or any other conceivable source of information, such as ERP, MES, CAD, CAM, machine, IoT connections, at least one customer and/or at least one provider, at least one CRM management system and/or surveillance unit.

In addition to that, the central computer may also be in connection with other providers of information relating to multiple variables influencing production, such as materials, tooling, spare parts, maintenance, design, specification or customers of parts, constructions and/or products. Information related to process parameters and performance variables may be retrievable via integrated multiple data sources, typically sources as mentioned above. Different numbers of connected, connectable or integrated end-points results in different optimization advantages as well as different cost and/or complexity of the integrated system.

In one embodiment data is retrievable from two end-points. In one example data is retrievable from two end-points, such as an ERP system and the machine. An advantage of having data retrieved from two end-points, such as an ERP system and the machine, is that product geometry may be modified to meet desired tolerances while using the current machine configuration.

In one embodiment data is retrievable from three end-points. In one example data is retrievable from three end-points, such as MES, the machine and IoT. An additional advantage of when data is retrievable from three end-points, such as MES, the machine and IoT, is that it is possible to control accessibility of additional tooling via IoT and configure the machine with a complete tooling configuration which consists of a combination of current and accessible tooling. Further, product geometry may be modified to meet desired tolerances while using a part of current tooling configuration.

In one embodiment data is retrievable from four end-points. In one example data is retrievable from four end-points, such as MES, the machine, IoT and a customer. An additional advantage of when data is retrievable from four end-points, such as MES, the machine, IoT and a customer, is that it is possible to integrate a customer to accept said modification of product geometry. Further, product geometry may be modified to meet desired tolerances while using a part of current tooling configuration. Yet further, it is possible to control accessibility of additional tooling via IoT and configure the machine with a complete tooling configuration which consists of a combination of current and accessible tooling.

In one embodiment data is retrievable from five end-points. In one example data is retrievable from five end-points such as MES, the machine, IoT, a customer and a designer. An additional advantage of when data is retrievable from five end-points, such as MES, the machine, IoT, a customer and a designer, is that it is possible to integrate both a customer and a designer to accept said modification of product geometry. Further, product geometry may be modified to meet desired tolerances while using a part of current tooling configuration. Yet further, it is possible to control accessibility of additional tooling via IoT and configure the machine with a complete tooling configuration which consists of a combination of current and accessible tooling.

In one embodiment data is retrievable from more than five end-points. In one example data is retrievable from six end-points, such as MES, the machine, IoT, a customer, a designer and a provider of sheet material. An additional advantage of when data is retrievable from six end-points, such as MES, the machine, IoT, a customer, a designer and a provider of sheet material, is that it is possible to integrate a provider of sheet material to modify the size of the sheet material to fit a plurality of said modified product geometries, provide said modified sheet material and produce said modified product geometries out of said modified sheet material. Further, the product geometry may be modified to meet desired tolerances while using a part of current tooling configuration. Yet further, it is possible to control accessibility of additional tooling via IoT and configure the machine with a complete tooling configuration which consists of a combination of current and accessible tooling. Further, it is possible to integrate one customer and one designer to accept said modification of product geometry.

An alternative definition of the central computer is that different end-points such as ERP, MES, CAD, CAM, machine, IoT, customer, provider, information sources, at least one CRM management system and/or surveillance unit are integrated with each other to exchange data and to make decisions.

The invention claimed is:

1. A computer-controlled method for modifying process parameters based on optimum operation performance criteria for a metal working process, said method comprising the steps of:
inputting desired process parameters for at least one product to be machined,
generating resulting operational data based on the desired process parameters,
selecting at least one optimization technique to define a function, said function comprising the desired process parameters,
generating the function for optimization with respect to productivity by using the desired process parameters as a basis to define ranges for performance variables and/or ranges for process parameters,
applying the at least one optimization technique to said function, whereby optimum operation performance criteria are determined for the function including process parameters and performance variables to obtain a set of optional attributes to be used for controlling the metal working process,
comparing the generated operational data with the optimum operation performance criteria, and
on condition that the comparing indicates a difference and that the optimum operation performance criteria indicate a potential performance advantage, presenting the optimum operation performance criteria to a decision-making entity and allowing it to modify the desired process parameters based on the presented optimum operation performance criteria for the metal working process.

2. A method for modifying process parameters based on optimum operation performance criteria for a metal working process according to claim 1, wherein the step of modifying process parameters includes summarising process parameters.

3. A method for modifying process parameters based on optimum operation performance criteria for a metal working process according to claim 1, wherein a proposed order to an external partner is prepared comprising material, tools, spare parts, maintenance, and/or logistics if required to obtaining optimum performance criteria.

4. A method for modifying process parameters based on optimum operation performance criteria for a metal working process according to claim 1, wherein operational data comprises at least one of the performance variables quality, time of delivery and total cost.

5. A method for modifying process parameters based on optimum operation performance criteria for a metal working process according to claim 1, wherein the optimum operation performance criteria comprise at least one of the criteria production cost, amount of waste, quality, delivery precision.

6. A method for modifying process parameters based on optimum operation performance criteria for a metal working process according to claim 1, the metal working process being any industrially applicable cutting technology based on laser, flames, plasma, water jet, ion, air, bending, pressing, punch pressing, press-braking, welding, milling, drilling and turning.

7. A method for modifying process parameters based on optimum operation performance criteria for a metal working process according to claim 1, wherein the metal working process relates to machining of sheet metal.

8. A method for modifying process parameters based on optimum operation performance criteria for a metal working process according to claim 1, wherein the process parameters and performance variables are dynamically monitored and controlled.

9. A method for modifying process parameters based on optimum operation performance criteria for a metal working process according to claim 1, further comprising the steps of:
retrieving process parameters from different sources relating to the metal working process, the process parameters including one or more of production order, batch volume, product geometry and predefined tolerances, required metal working operations, required tooling configuration, stacking pattern of produced items, and/or process parameter data from previous operations,
retrieving performance variables from different sources relating to the metal working process, the performance variables including one or more of determined tolerances of produced items, process time, tooling availability, tooling lifetime, material removal rate, operator working environment, order stock, delivery time, required pressing position and/or performance variable data from previous operations, storing the process parameters and performance variables in a consolidated memory in association with a computer system, the consolidated memory including one or both of an enterprise resource planning (ERP) or manufacturing execution (MES) system, making the process parameters and or performance variables available for a machine controller or computing system for application of optimization techniques to select optimum operation performance criteria.

10. A method for modifying process parameters based on optimum operation performance criteria for a metal working process according to claim 1, wherein tools and/or produced items and/or sources along the production line and/or sources within the logistics flow are embedded with electronics, software, sensors and/or network connectivity, enabling these objects to exchange process parameters and/or performance variables with the computer system.

11. A method for modifying process parameters based on optimum operation performance criteria for a metal working process according to claim 1, wherein predefined and/or determined tolerances of produced items include any of the following performance variables:

material properties including one or more of hardness, toughness, size, format and thickness, product geometries including one or more of radii, angles and dimensions, and production defects including one or more of bulges, bending lines, pressure deformations and other visual attributes.

12. A method for modifying process parameters based on optimum operation performance criteria for a metal working process according to claim 1, wherein product geometries includes data on bending curves, stretch, strain, compensation factors and tooling preferences.

13. A method for modifying process parameters based on optimum operation performance criteria for a metal working process according to claim 1, wherein process parameters in addition to the tooling configuration also includes other enabling requirements including one or more of spare parts, tools, maintenance, material, shape and/or dimension.

14. A method for modifying process parameters based on optimum operation performance criteria for a metal working process according to claim 1, wherein the method is adapted to be used in a computer numerical control (CNC/NC) or programmable logic controller (PLC) system.

15. An industrial machine system comprising:

a machine comprising an actuator system for performing an industrial operation, a computing system in connection with the machine, comprising a machine controller, and the machine controller being adapted to carrying out the method according to claim 1.

16. The industrial machine system according to claim 15, wherein the computing system is configured to collect data and use the data for data analysis and/or optimization and/or transfer the data to another system for data analysis and/or optimization.

17. A non-transient computer-readable medium or media comprising data representing coded instruction sets configured for execution by a processor in a computer, the instructions comprising the method according to claim 1.

* * * * *